United States Patent
Mehli et al.

(10) Patent No.: US 12,203,042 B2
(45) Date of Patent: Jan. 21, 2025

(54) SYSTEM AND METHOD FOR HYDROTHERMAL CARBONIZATION

(71) Applicant: GREGIO ENERGIE AG, Chur (CH)

(72) Inventors: Andreas Mehli, Chur (CH); Ignaz Canova, Chur (CH)

(73) Assignee: GREGIO ENERGIE AG, Chur (CH)

( * ) Notice: Subject to any disclaimer, the term of this patent is extended or adjusted under 35 U.S.C. 154(b) by 0 days.

(21) Appl. No.: 18/285,741

(22) PCT Filed: Apr. 8, 2022

(86) PCT No.: PCT/EP2022/059546
§ 371 (c)(1),
(2) Date: Oct. 5, 2023

(87) PCT Pub. No.: WO2022/218889
PCT Pub. Date: Oct. 20, 2022

(65) Prior Publication Data
US 2024/0199967 A1    Jun. 20, 2024

(30) Foreign Application Priority Data

Apr. 16, 2021  (EP) .................... 21169026

(51) Int. Cl.
| | | |
|---|---|---|
| F28D 7/12 | (2006.01) | |
| C10L 9/08 | (2006.01) | |
| F28D 7/06 | (2006.01) | |
| F28F 19/01 | (2006.01) | |

(52) U.S. Cl.
CPC ............ *C10L 9/086* (2013.01); *C10L 2290/06* (2013.01); *C10L 2290/143* (2013.01); *C10L 2290/56* (2013.01)

(58) Field of Classification Search
CPC ........... C10L 2290/06; C10L 2290/141; C10L 2290/143; C10L 2290/146; C10L 2290/24; C10L 2290/56; C10L 9/086; F28D 7/106; F28D 7/12; F28F 19/008; F28F 19/01; F28F 5/06; Y02E 50/10
See application file for complete search history.

(56) References Cited

FOREIGN PATENT DOCUMENTS

| | | | | |
|---|---|---|---|---|
| DE | 102008047884 A1 | | 4/2010 | |
| DE | 102015010455 A1 | * | 2/2017 | ............ B08B 1/008 |
| EP | 2166061 A1 | * | 3/2010 | ............ C10B 47/30 |
| EP | 2131953 B1 | | 11/2018 | |

OTHER PUBLICATIONS

EP-2166061-A1 Bib Translated (Year: 2010).*
EP2166061A1—Claim Translated (Year: 2010).*
(Continued)

*Primary Examiner* — Ellen M McAvoy
*Assistant Examiner* — Chantel Graham
(74) *Attorney, Agent, or Firm* — Hard IP LLC

(57) ABSTRACT

A system for the hydrothermal carbonization of a flowable biomass comprises a pump, a heat exchanger and a tubular reactor. The pump is connected to the heat exchanger via a delivery conduit for the flowable biomass, and the heat exchanger is connected to the tubular reactor via a connecting conduit. The heat exchanger contains an insert element and the tubular reactor contains no insert element.

16 Claims, 5 Drawing Sheets

(56) References Cited

OTHER PUBLICATIONS

EP2166061A1—Description Translated (Year: 2010).*
DE102015010455A1—Bib Translated (Year: 2017).*
DE102015010455A1—Claim Translated (Year: 2017).*
DE102015010455A1—Description Translated (Year: 2017).*
International Search Report and Written Opinion issued for International Application No. PCT/EP2022/059546 on Jul. 14, 2022, 9 pages.

\* cited by examiner

SYSTEM AND METHOD FOR HYDROTHERMAL CARBONIZATION

CROSS-REFERENCE TO RELATED APPLICATIONS

This application is a U.S. national stage filing under 35 U.S.C. 371 of international patent application no. PCT/EP2022/059546, filed on Apr. 8, 2022, which claims priority to European patent application no. 21169026.8, filed on Apr. 16, 2021, the contents of both of which are incorporated herein by reference in their entirety.

TECHNICAL FIELD

The present invention relates to a system and a method for hydrothermal carbonization, hereinafter referred to as HTC, for example of organic residues, which are referred to as wet biomasses, e.g., liquid manure, raw sludge, digested sludge. The residues can include, for example, waste materials that occur in food production, in agriculture or in wastewater treatment, for example in sewage treatment plants.

DESCRIPTION OF RELATED ART

Document EP 2 131 953 B1 describes a method for the hydrothermal carbonization of biomass. A catalyst is added to the biomass and it is converted into coal or oil in a pressure vessel by increasing the temperature and/or pressure. The pressure vessel is designed as a pipeline with an inlet lock and an outlet lock, so that biomass, water and the catalyst can be fed to the pressure vessel at intervals. The pressure vessel is designed as a jacketed vessel so that it can be heated by a heat transfer medium. In the pressure vessel, the biomass is converted into reaction products containing carbon, with the biomass being conveyed through the pressure vessel by means of a screw conveyor. The pressure is generated by means of a piston press in front of the pressure vessel or an eccentric screw pump. The reaction products are formed as a coal or oil finely dispersed in the water.

When operating the pressure vessel with the screw conveyor, it has proven to be disadvantageous that the reaction products deposit on the inner wall of the pressure vessel and can block or even damage the screw conveyor, so that continuous operation of the pressure vessel cannot be guaranteed.

From EP 2 166 061 A1 or DE 10 2008 047 884 A1 it is known to provide a feed device for a tubular reactor, which is equipped with a first and second closure device and a piston pump in order to bring the biomass to the pressure required in the tubular reactor from 10 to 30 bar to compress.

The object of the invention is to provide a system and a method by means of which a hydrothermal carbonization of biomass can be performed continuously.

SUMMARY OF THE INVENTION

When the term "for example" is used in the following description, this term refers to exemplary embodiments and/or variants, which is not necessarily to be construed as a more preferred application of the teachings of the invention. Similarly, the terms "preferably", "preferred" should be understood as referring to one example from a set of exemplary embodiments and/or variants, which should not necessarily be construed as a preferred application of the teachings of the invention. Accordingly, the terms "for example," "preferably," or "preferred" may refer to a plurality of exemplary embodiments and/or variants.

The following detailed description contains various embodiments of the system according to the invention and the method according to the invention. The description of any particular system or method is to be considered as exemplary only. In the specification and claims, the terms "include", "comprise", "have" are interpreted as "including but not limited to".

A system for the hydrothermal carbonization of flowable biomass comprises a pump, a heat exchanger and a tubular reactor, the pump being connected to the heat exchanger via a delivery conduit for the flowable biomass and wherein the heat exchanger is connected to the tubular reactor via a connecting conduit. In the operating state, the heated, flowable biomass is thus located in the connecting conduit and can be fed to the tubular reactor for converting the flowable biomass into a carbonaceous reaction product. The heat exchanger contains an insert element and the tubular reactor does not contain an insert element. The insert element is configured without a core. In other words, the flowable biomass can flow unhindered through a core portion of the heat exchanger. A cavity is formed by the insert element. This cavity surrounds the longitudinal axis of the heat exchanger, the cavity thus extends along a central portion of the heat exchanger, which can also be referred to as the core portion.

The core portion of the heat exchanger extends along the longitudinal axis of the heat exchanger. The core portion of the heat exchanger includes in particular a portion of the volume of the interior space of the heat exchanger. The core portion is configured in particular as a cylindrical cavity. The cavity can be configured as a rotationally symmetrical cavity whose diameter can change over the longitudinal axis of the heat exchanger. The cylindrical cavity surrounds the longitudinal axis of the heat exchanger. In particular, the diameter of the cavity of the core portion DK corresponds to at least 25% of the diameter D of the interior space of the heat exchanger. The diameter DK can also represent a mean diameter of a rotationally symmetrical cavity with a variable cross section. If the cavity is not cylindrical, DK corresponds to the equivalent diameter of a cylindrical cavity of the same volume. According to an embodiment, the diameter of the cavity of the core portion DK corresponds to at least 30% of the diameter D of the interior space of the heat exchanger. According to an embodiment, the interior space of the heat exchanger is cylindrical. If the interior space of the heat exchanger is not cylindrical, the diameter D corresponds to the equivalent diameter of a cylindrical interior space of the same volume.

The insert element of the heat exchanger prevents deposits resulting from inhomogeneities in the biomass flowing through the heat exchanger or by an inhomogeneous temperature distribution in the biomass flowing through the heat exchanger. Accordingly, the insert element is not connected to the inner wall of the duct which forms the flow channel for the flowable biomass. The insert element or the duct casing can be rotatable relative to one another, so that any biomass adhering to the inner wall of the duct can be detached by means of the insert element.

For example, liquid manure, fermentation residues or sewage sludge can be used as biomass. Combinations of the individual biomasses can also be used as input materials, for example liquid manure and fermentation residues can be processed in combination. Sewage sludge can in particular include pipe sludge or digested sludge.

According to an embodiment, the heat exchanger contains a heat transfer element which is suitable for heating the flowable biomass to a temperature of over 200 degrees Celsius. At a temperature of at least 200 degrees Celsius, the carbonization reaction can be completed within a maximum period of 4 hours in the tubular reactor without additional heat supply in the tubular reactor with a yield of at least 80% of carbonaceous reaction products. The temperature in the tube of the tubular reactor is preferably in a range from 180 degrees Celsius up to and including 250 degrees Celsius. The pressure in the tube of the tubular reactor is preferably in a range from 10 bar up to and including 40 bar. Although the carbonization reaction is a slightly exothermic reaction, this effect is not noticeable in the form of a warming that can be detected with conventional measuring devices. It has therefore proven expedient to supply the heat required for the carbonization reaction to the flowable biomass by means of at least one heat exchanger. The tubular reactor does in particular not contain a heat transfer element.

The heat transfer element can be configured as a heating element, for example as a resistance heater. The heat transfer element can also contain a duct for a heat transfer fluid. In particular, the tubular reactor does not contain a heat transfer element from the group consisting of a heating element, a resistance heater or a channel for a heat transfer fluid. For example, the tubular reactor is provided with a jacket element which is configured as a cylindrical jacket element. The jacket element can contain a plastic, a metal or a composite material. The jacket element can comprise several layers.

According to an embodiment, the heat exchanger for heating the flowable biomass comprises a duct for the flowable biomass, wherein the duct comprises an inlet opening and an outlet opening, wherein the duct is surrounded by a heatable duct casing.

According to an embodiment, the duct contains an insert element which is not connected to the inner wall of the duct casing, so that the duct casing and the insert element are configured to be movable relative to each other in the duct.

According to an embodiment, the insert element is configured as a spiral-shaped insert element. In particular, the length of the insert element can essentially correspond to the length of the duct.

According to an embodiment, the insert element has an outer diameter that is up to 10 mm smaller than the inner diameter of the heatable duct casing. According to an embodiment, the insert element has an inner diameter that is greater than 0 and at most 5 mm smaller than the outer diameter of the insert element.

According to an embodiment, the insert element is configured as a spiral. The spiral can form a gradient of at least 20 mm and a maximum of 50 mm. With a spiral, an optimal delivery rate can be achieved with the lowest possible pressure loss.

According to an embodiment, the insert element has a wall thickness of 2 up to and including 10 mm.

According to an embodiment, the insert element contains a twisted tubular element. According to an embodiment, a twisted tubular element contains at least one spiral flight. A spiral flight can consist of an element of the group consisting of a protrusion, a groove or an indentation on the twisted tubular element surface that runs spirally. According to one embodiment, two counter-rotating spiral flights can be provided.

According to an embodiment, the insert element contains a metallic material. According to an embodiment, the spiral-shaped insert element contains stainless steel or spring steel.

According to an embodiment, the heatable duct casing contains a duct casing channel for a heat transfer fluid, wherein the duct casing channel extends from a duct casing channel inlet opening for the entry of the heat transfer fluid into the duct casing channel to a duct casing channel outlet opening for the discharge of the heat transfer fluid from the duct casing channel.

When the pump is in the operating state, the pressure of the flowable biomass in the delivery conduit leading to the heat exchanger can be increased to a pressure of, in particular, at least 10 bar.

The system according to each of the embodiments can contain a preheater for preheating the biomass entering the heat exchanger to a temperature of up to 150 degrees Celsius. The heating can take place in particular to a temperature in the range from 50 degrees Celsius up to and including 120 degrees Celsius.

A tubular rector can be used for each system, which is insulated from the environment with an insulating jacket. In particular, the tubular reactor cannot contain a heat exchanger. The inner diameter of the tube of the tubular reactor can in particular be constant. The inner diameter of the tube can be in the range from 10 up to and including 1000 mm.

According to an embodiment, the carbon-containing reaction products leaving the tubular reactor as a product stream can be used as a heat transfer medium, for example for a preheater that is arranged between the pump and the heat exchanger and is used to preheat the flowable biomass.

According to an embodiment, a separation unit is provided for separating the product flow into an aqueous phase and a solid-rich phase. This separation unit can be arranged downstream of the tubular reactor. The separation unit may comprise a pressing device, a depositing device or a centrifugal device. The separation unit can be configured as a hose press or as a piston press. The separation unit can be configured as a centrifuge. The separation unit can be configured as a sedimentation device. The separation unit can include a dryer. The separation unit can include an evaporator. A plurality of separation units can be provided. The individual separation units can be of the same type. It is also possible to provide any combination of separation units. Depending on the biomass used, a sedimentation device and a pressing device can be provided, for example. According to an embodiment, a first separation unit can be provided, which is configured as a pressing device, and a second separation unit can be provided, which is configured as a dryer.

According to an embodiment, the dryer for drying the solid-rich phase to produce pellets or briquettes is arranged downstream of the pressing device.

According to an embodiment, a separation unit is provided to reduce the solids content of the aqueous phase. The separation unit can be configured as an evaporator, in particular as a vacuum evaporator.

According to an embodiment, a first separation unit for separating the product flow into an aqueous phase and a solid-rich phase can be provided, which is configured as a pressing device. The solid-rich phase, which leaves the pressing device as one of the product streams, can be dried in a second separation unit, which is configured as a dryer. The liquid phase leaving the pressing device can be separated into a concentrate and a volatile portion in a third separation unit, which is configured as an evaporator. The evaporator can be configured in particular as a vacuum evaporator. The volatile portion of the liquid phase leaving the evaporator can be at least partially condensed in a condenser. The condensed volatile fraction can be sent to a wastewater treatment plant.

The condensate of the evaporator can optionally be fed together with the liquid product streams from upstream separation units for separating the solid phases, in particular, to the pressing device and/or to the dryer of the flowable biomass. If necessary, a preheater can be used to preheat the reflux.

According to an embodiment, a pressure-reducing element is provided for reducing the pressure of the product stream, which contains the carbonaceous reaction products and exits from the tubular reactor. In particular, the pressure-reducing element is arranged downstream of the tubular reactor. The pressure-reducing element can include a throttle element, for example.

The invention also includes a heat exchanger for heating a flowable biomass, wherein the heat exchanger comprises a duct for the flowable biomass, wherein the duct comprises an inlet opening and an outlet opening, wherein the duct is surrounded by a heatable duct casing, wherein the duct contains a spiral-shaped insert element which is not connected to the inner wall of the duct casing, so that it is movably arranged relative to the duct casing in the duct. The spiral-shaped insert element is configured as a band-shaped element which forms a spiral. In particular, the spiral has a pitch that is in the range of 20 mm up to and including 50 mm. In particular, the band-shaped element has a cross-sectional area that is circular or oval. The outer diameter of the spiral-shaped insert element is in particular 1 up to and including 20 mm smaller than the inner diameter of the duct casing. In particular, the spiral-shaped insert element has an inner diameter which is at least 10 mm smaller than the outer diameter of the duct casing.

In particular, the spiral-shaped insert element has no core element. This means that the flowable biomass can flow through the spiral-shaped insert element along its central axis. Thus, a continuous passage is formed along the longitudinal axis of the spiral-shaped insert element. The central axis of the passage essentially corresponds to the longitudinal axis of the spiral-shaped insert element. The area around the central axis, hereinafter referred to as the core area, contains in particular no installations, so that the flowable biomass can flow through the passage in the core area essentially unhindered. The outer edges of the spiral-shaped insert element can mesh with the inner wall of the duct casing. In the edge regions adjoining the inner wall of the duct casing, the flow is rearranged by the spiral-shaped insert element, so that no dead zones can form at the inner wall of the duct casing.

According to an embodiment, the spiral-shaped insert element is rotatable. The spiral-shaped insert element can be set in rotary motion by means of a drive element. According to this embodiment, the rotary movement takes place about the longitudinal axis of the spiral-shaped insert element.

In particular, the duct casing contains a duct casing channel for a heat transfer fluid, the duct casing channel extending from a duct casing channel inlet opening for the heat transfer fluid to enter the duct casing channel to a duct casing channel outlet opening for the heat transfer fluid to exit from the duct casing channel. The length of the spiral-shaped insert element can essentially correspond to the length of the duct.

The invention also relates to a heat exchanger for heating a flowable biomass, the heat exchanger comprising a duct for the flowable biomass. The duct includes an inlet opening and an outlet opening. The duct is surrounded by a heatable duct casing, wherein the duct contains a spiral-shaped insert element which is not connected to the inner wall of the duct casing so that it is movably arranged relative to the duct casing. In particular, the spiral-shaped insert element is movable relative to the duct casing in the duct. The spiral-shaped insert element is configured as a band-shaped element which forms a spiral. The spiral can have a pitch ranging from 20 mm up to and including 50 mm.

According to an embodiment, the duct casing can contain a duct casing channel for a heat transfer fluid, wherein the duct casing channel extends from a duct casing channel inlet opening for the supply of the heat transfer fluid to the duct casing channel to a duct casing channel outlet opening for the discharge of the heat transfer fluid from the duct casing channel.

The invention also relates to a method for the hydrothermal carbonization of flowable biomass, wherein the flowable biomass is conveyed by a pump into a heat exchanger, wherein the flowable biomass is heated in the heat exchanger, wherein the heated flowable biomass is fed to a tubular reactor after exiting the heat exchanger. The heated flowable biomass flows in a plug flow through the tubular reactor so that it is converted into a carbonaceous reaction product in the tubular reactor. In particular, the heat exchanger contains an insert element which is arranged in the duct for the flowable biomass flowing through the heat exchanger, wherein deposits of the flowable biomass are removed from the inner wall of the duct by means of the insert element.

According to an embodiment, the biomass in the heat exchanger is heated to a temperature of at least 200 degrees Celsius. According to an embodiment, the pressure of the biomass is increased by at least 10 bar by means of the pump.

By means of the method according to the invention, a reduction in power consumption by 23% and in heat consumption by 61% can be achieved in comparison to conventional sewage sludge treatment.

BRIEF DESCRIPTION OF THE DRAWINGS

The system according to the invention for carrying out the method according to the invention is presented below for a few embodiments. It is shown in FIG. 1 a schematic of a system according to a first embodiment, FIG. 2 a schematic of a system according to a second embodiment, FIG. 3 a schematic of a system according to a third embodiment, FIG. 4 a schematic of a system according to a fourth embodiment, FIG. 5a a detail of a heat exchanger according to a first variant, FIG. 5b a radial section through the heat exchanger of FIG. 5a, FIG. 6 a detail of a heat exchanger according to a second variant, FIG. 7 a detail of a heat exchanger according to a third variant, FIG. 8 a schematic of a system with a heat exchanger according to a variant shown in one of FIGS. 5 to 7.

FIG. 9b a radial section through the heat exchanger of FIG. 9a,

DETAILED DESCRIPTION

Figure 1:
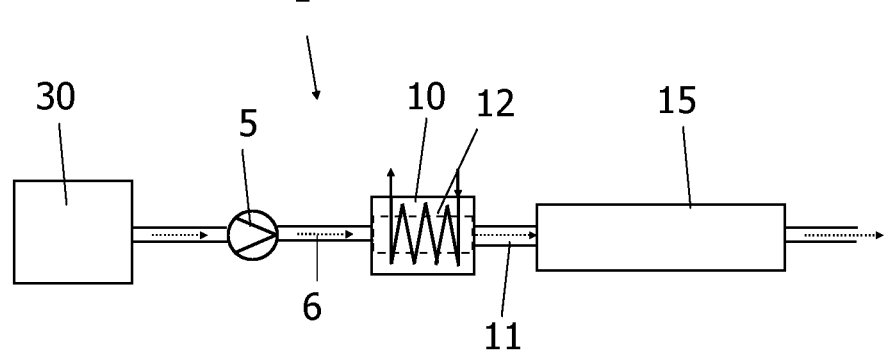

FIG. 1 shows a system 1 for the hydrothermal carbonization of a flowable biomass, comprising a pump 5, a heat exchanger 10 and a tubular reactor 15. The pump 5 is connected to the heat exchanger 10 via a delivery conduit 6 for the flowable biomass. If the pump 5 is in the operating state, the pressure of the flowable biomass in the delivery conduit 6 leading to the heat exchanger 10 can be increased to a pressure of at least 10 bar. The heat exchanger 10 is connected to the tubular reactor 15 via a connecting conduit 11. In the operating state, there is thus a heated biomass in the connecting conduit 11, which can be fed to the tubular reactor 15 for converting the heated biomass into a carbonaceous reaction product. The heat exchanger 10 contains an insert element 12 and the tubular reactor 15 does not contain an insert element. For the system, a tubular rector 15 can be used, which is insulated from the environment by means of an insulating jacket. In particular, the tubular reactor 15 does not contain a heat exchanger.

The flowable biomass can be stored in a storage container 30 if it is not supplied continuously by an upstream process.

Figure 2:
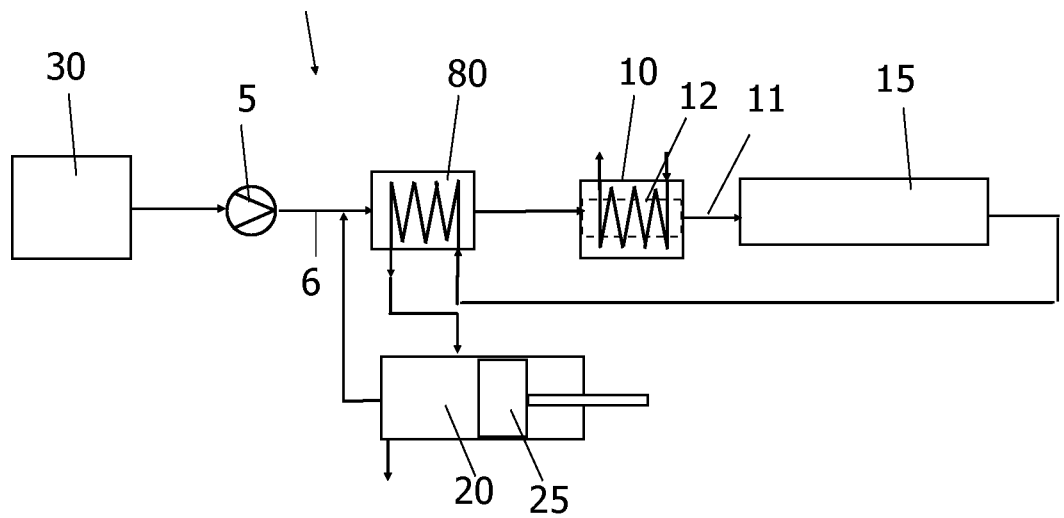

FIG. 2 shows a system 2 for the hydrothermal carbonization of a flowable biomass according to a second embodiment. The same reference numerals as in FIG. 1 are used for elements that are the same or have the same effect. The system 2 comprises a pump 5, a heat exchanger 10, a tubular reactor 15 and a separation unit 20. The pump 5 is connected to the heat exchanger 10 via a delivery conduit 6 for the flowable biomass. If the pump 5 is in the operating state, the pressure of the flowable biomass in the delivery conduit 6 leading to the heat exchanger 10 can be increased to a pressure of at least 10 bar. The heat exchanger 10 is connected to the tubular reactor 15 via a connecting conduit 11. In the operating state, there is thus a heated biomass in the connecting conduit 11, which can be fed to the tubular reactor 15 for converting the heated biomass into a carbonaceous reaction product. The heat exchanger 10 contains an insert element 12 and the tubular reactor 15 does not contain an insert element. For the system, a tubular rector 15 can be used, which is insulated from the environment by means of an insulating jacket. In particular, the tubular reactor 15 does not contain a heat exchanger.

The separation unit 20 can be configured as a pressing device. The separation unit 20 is used to separate the solid components of the carbonaceous reaction product from the liquid components of the carbonaceous reaction product. The separation unit can be configured, for example, as a piston press or as a hose press. The solid components of the carbon-containing reaction product can be further processed in a downstream process or fed to an incinerator for energy generation. The liquid components of the reaction product containing carbon can be fed to a downstream cleaning process. Alternatively, at least some of the liquid components can be fed into the delivery conduit 6 in order to be fed back to the heat exchanger 10 and the tubular reactor 15 for conversion together with the flowable biomass.

According to this embodiment, the reaction products containing carbon, which are discharged from the tubular reactor 15 as a product stream, can be used as a heat transfer medium, for example for a preheater 80 which is arranged between the pump 6 and the heat exchanger 10 and is used to preheat the flowable biomass.

Figure 3:
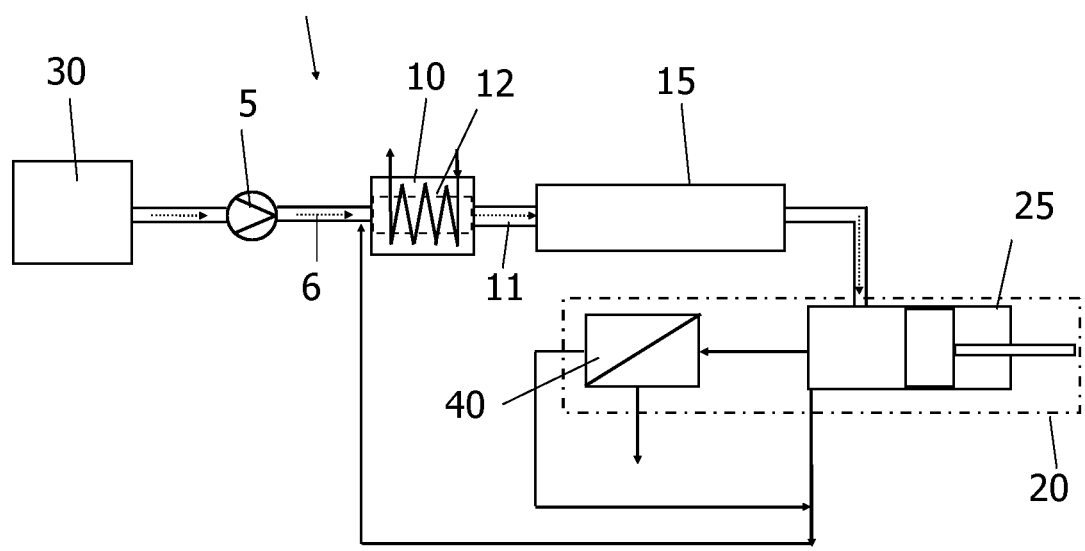

FIG. 3 shows a system 3 for the hydrothermal carbonization of a flowable biomass according to a third embodiment. The same reference numerals as in FIG. 1 or FIG. 2 are used for elements that are the same or have the same effect. The system 3 comprises a pump 5, a heat exchanger 10, a tubular reactor 15 and a separation unit 20. The pump 5 is connected to the heat exchanger 10 via a delivery conduit 6 for the flowable biomass. If the pump 5 is in the operating state, the pressure of the flowable biomass in the delivery conduit 6 leading to the heat exchanger 10 can be increased to a pressure of at least 10 bar. The heat exchanger 10 is connected to the tubular reactor 15 via a connecting conduit 11. In the operating state, there is thus a heated biomass in the connecting conduit 11, which can be fed to the tubular reactor 15 for converting the heated biomass into a carbonaceous reaction product. The heat exchanger 10 contains an insert element 12 and the tubular reactor 15 does not contain an insert element. For the system, a tubular rector 15 can be used, which is insulated from the environment by means of an insulating jacket. In particular, the tubular reactor 15 does not contain a heat exchanger.

The separation unit 20 can be configured as a pressing device. The separation unit 20 is used to separate the solid components of the carbonaceous reaction product from the liquid components of the carbonaceous reaction product. The separation unit can be configured, for example, as a piston press or as a hose press. The solid components of the carbon-containing reaction product are fed to a dryer 40 according to this embodiment.

The portion of liquid components of the reaction product containing carbon in the solid can be lowered to less than 15%. The solid can be comminuted in a subsequent method step, for example formed into pellets or briquettes. The solid can also be further processed into a free-flowing bulk material. The solid can be used as a fuel, for example. Depending on the composition, the solid can also be used as a fertilizer. Additional components can be added to the solid in subsequent method steps depending on the application. If drying is provided for the solid components of the carbonaceous reaction product, the solid can be transported more cheaply and can be stored for a prolonged time. Of course, the solid can also be used as fuel in an incinerator to generate energy.

The liquid components of the reaction product containing carbon can be fed to a downstream cleaning process. Alternatively, at least some of the liquid components can be fed into the delivery conduit 6 in order to be fed back to the heat exchanger 10 and the tubular reactor 15 for conversion together with the flowable biomass.

Figure 4:
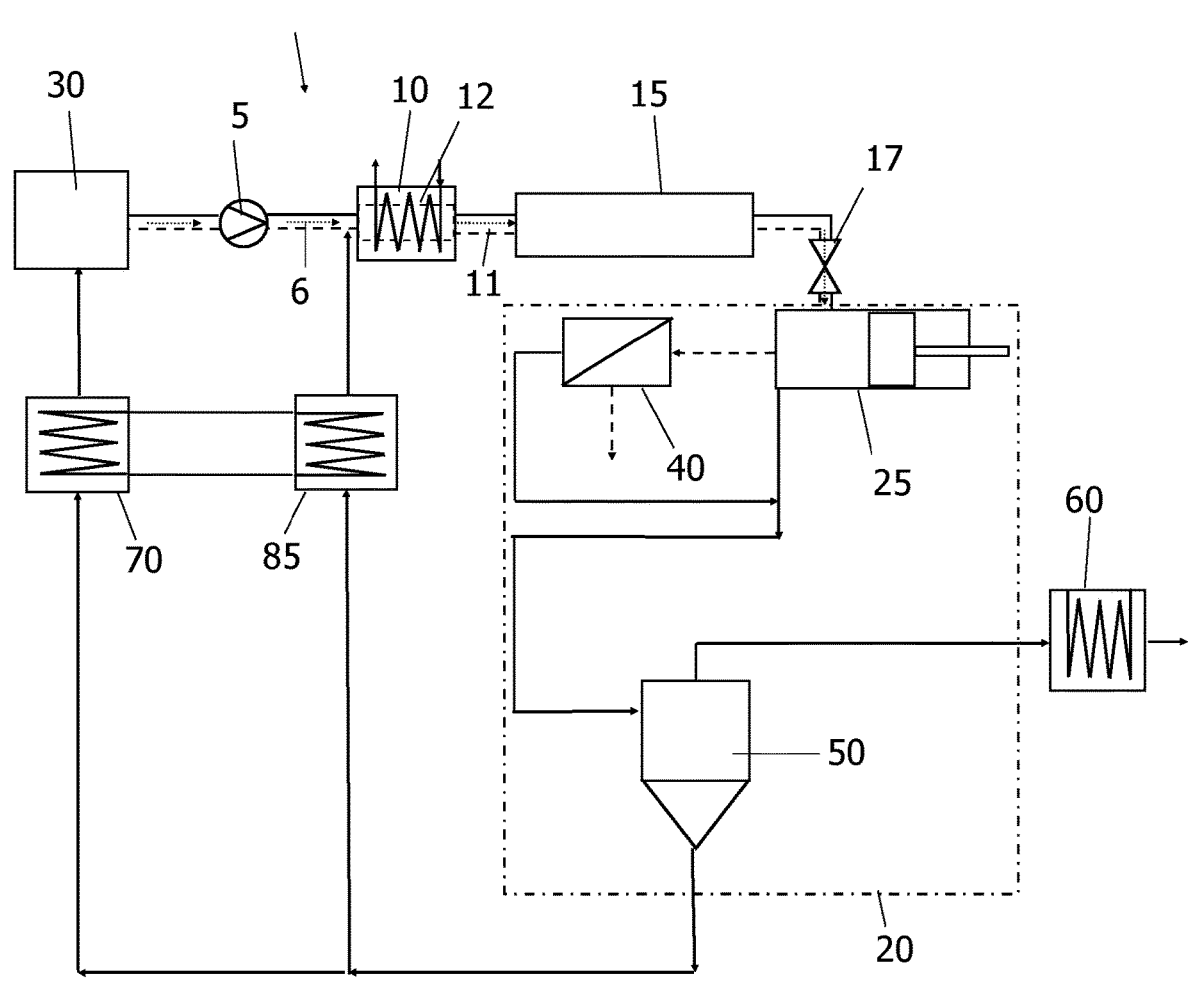

FIG. 4 shows a system 4 for the hydrothermal carbonization of a flowable biomass according to a fourth embodiment. The same reference numerals as in the previous embodiments are used for elements that are the same or have the same effect. The system 4 comprises a pump 5, a heat exchanger 10, a tubular reactor 15 and a separation unit 20. The pump 5 is connected to the heat exchanger 10 via a delivery conduit 6 for the flowable biomass. If the pump 5 is in the operating state, the pressure of the flowable biomass in the delivery conduit 6 leading to the heat exchanger 10 can be increased to a pressure of at least 10 bar. The heat exchanger 10 is connected to the tubular reactor 15 via a connecting conduit 11. In the operating state, there is thus a heated biomass in the connecting conduit 11, which can be fed to the tubular reactor 15 for converting the heated biomass into a carbonaceous reaction product. The heat exchanger 10 contains an insert element 12 and the tubular reactor 15 does not contain an insert element. For the system, a tubular rector 15 can be used, which is insulated from the environment by means of an insulating jacket. In particular, the tubular reactor 15 does not contain a heat exchanger.

The separation unit 20 can comprise a pressing device 25. The separation unit 20 is used to separate the solid components of the carbonaceous reaction product from the liquid components of the carbonaceous reaction product. A plurality of similar or different separation units can be provided for this purpose. According to this embodiment, a first separation unit 20 is provided, which is configured as the pressing device 25. The separation unit can be configured, for example, as a piston press or as a hose press. According to the present embodiment, a second separation unit 20 is provided, which is configured as a dryer 40. According to this embodiment, the solid components of the reaction product containing carbon are fed to the dryer 40.

The portion of liquid components of the carbonaceous reaction product in the solid can be lowered to less than 15%. The solid can be comminuted in a subsequent method step, for example formed into pellets or briquettes. The solid can also be further processed into a free-flowing bulk material. The solid can be used as a fuel, for example. Depending on the composition, the solid can also be used as a fertilizer. Additional components can be added to the solid in subsequent method steps depending on the application. If drying is provided for the solid components of the carbonaceous reaction product, the solid can be transported more cheaply and can be stored for prolonged time. Of course, the solid can also be used as fuel in an incinerator to generate energy.

The liquid components of the carbonaceous reaction product are fed to a downstream third separation unit. According to the present embodiment, the third separation unit comprises an evaporator 50. By means of the evaporator 50, at least some of the volatile components of the liquid components of the reaction product containing carbon are vaporized. The evaporator 50 can be operated as a vacuum evaporator to reduce the thermal energy required for evaporation. The liquid components of the carbonaceous reaction product contain more than 50% (w/w) water. The water is at least partially evaporated in the evaporator and, in a subsequent cooling step, cooled by a cooler and/or condensed by a condenser 60, if required. The cooler can also contain a preheater (not shown), which is used to preheat the flowable biomass before it enters the heat exchanger 10. The condensate can, for example, be fed to a wastewater treatment plant and returned to the water cycle.

The concentrate of the evaporator 50 can be at least partially fed into the delivery conduit 6 in order to be fed back to the heat exchanger 10 and the tubular reactor 15 together with the flowable biomass for carbonization.

Alternatively, the concentrate can be fed to a cooler 70 before it can be fed into the delivery conduit 6 or, alternatively, into the storage container 30. The cooler 70 can be coupled to a preheater 85 when the concentrate or the liquid components of the carbonaceous reaction products are fed from the pressing device 25 or the dryer 40 into the delivery conduit 6 for the flowable biomass.

According to each of the embodiments, the pressure of the stream of carbon-containing reaction products exiting from the tubular reactor 15 can be reduced to ambient pressure by a pressure-reducing element 17. Depending on the design of the downstream separation unit 20, unpressurized operation of the same can be more cost-effective, since the separation unit 20 and other system components possibly present downstream of the tubular reactor 15 do not need to be designed as pressure vessels in accordance with the required regulations.

The pressure-reducing element 17 can be configured as a throttle element, for example.

Figure 5A:
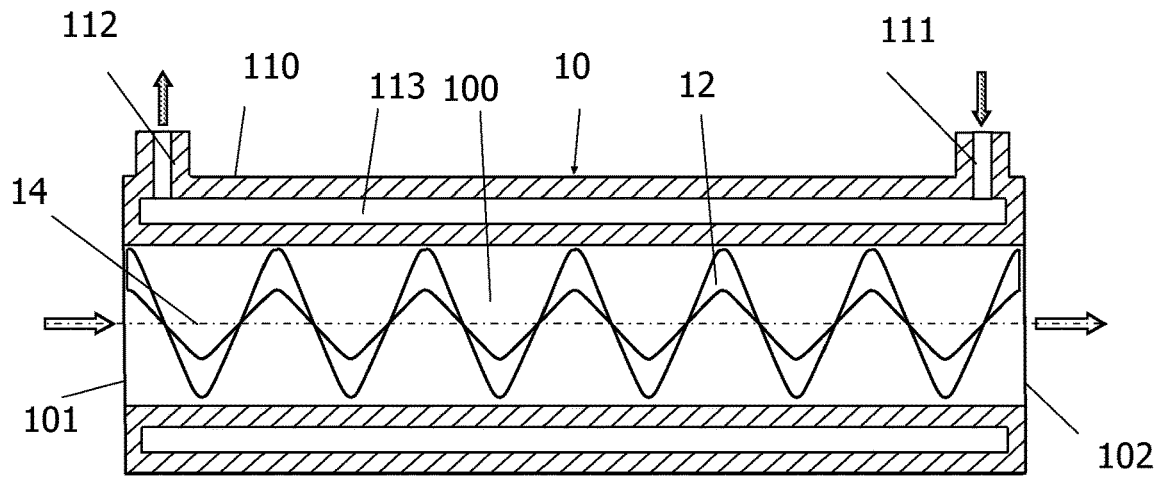

FIG. 5*a* shows a detail of a heat exchanger 10 according to a first variant, which can be used for any of the systems 1, 2, 3, 4 previously described.

The heat exchanger 10 for heating the flowable biomass comprises a duct 100 for the flowable biomass, wherein the duct 100 comprises an inlet opening 101 and an outlet opening 102, wherein the duct is surrounded by a heatable duct casing 110.

In particular, the insert element 12 is not connected to an inner wall of the heatable duct casing 110, so that the heatable duct casing 110 and the insert element 12 are arranged in the duct 100 such that they can be moved relative to one another.

According to an embodiment, the insert element 12 is configured as a spiral-shaped insert element. In particular, the length of the spiral-shaped insert element can essentially correspond to the length of the duct. The insert element 12 can have an outer diameter that is up to 10 mm smaller than the inner diameter of the heatable duct casing 110. In particular, the outer diameter of the insert element 12 can be up to 5 mm smaller than the inner diameter of the heatable duct casing 110. In the case of outer diameters of a maximum of 60 mm, the outer diameter of the insert element 12 can be smaller than the inner diameter of the heatable duct casing 110 by up to 2.5 mm. According to an advantageous variant, the insert element 12 has an inner diameter that is greater than 0 and at most 5 mm smaller than the outer diameter of the insert element 12.

According to an embodiment, the outer diameter can be 30% up to and including 50% larger than the inner diameter of the insert element 12. According to an embodiment, the inner diameter of the insert element 12 is 28 mm and the outer diameter is 52 mm. According to an embodiment, the spiral-shaped insert element is configured as a spiral with a pitch of at least 20 mm and at most 50 mm. According to an embodiment, the pitch of the spiral amounts to 38 mm.

In particular, the spiral-shaped insert element has a wall thickness of 2 up to and including 10 mm. According to an embodiment, the wall thickness is in a range from 4 up to and including 4.2 mm. For example, the spiral-shaped insert element can contain a metallic material. In particular, the spiral-shaped insert element can contain stainless steel or spring steel.

According to an embodiment, the heatable duct casing 110 contains a duct casing channel 113 for a heat transfer fluid, wherein the duct casing channel 113 extends from a duct casing channel inlet opening 111 for the entry of the heat transfer fluid into the duct casing channel 113 to a duct casing channel outlet opening 112 for the discharge of the heat transfer fluid from the duct casing channel 113.

Figure 5B:
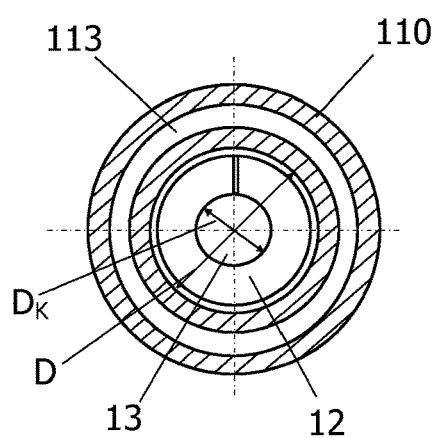

FIG. 5*b* shows a radial section through the heat exchanger according to FIG. 5*a*. The insert element 12 is configured without a core. In other words, the flowable biomass can flow unhindered through a core portion of the heat exchanger 10. A cavity 13 is formed by the insert element 12. This cavity 13 surrounds the longitudinal axis 14 of the heat exchanger 10, the cavity thus extends along a central portion of the heat exchanger 10, which can also be referred to as the core portion.

The core portion of the heat exchanger extends along the longitudinal axis 14 of the heat exchanger 10. The core portion of the heat exchanger includes, in particular, a portion of the volume of the interior space of the heat exchanger. The core portion is configured in particular as a cylindrical cavity 13. The cavity 13 surrounds the longitudinal axis 14 of the heat exchanger, which for the embodiment of a cylindrical cavity coincides with the longitudinal axis of the cylindrical cavity. In particular, the diameter of the cavity 13 of the core portion DK corresponds to at least 25% of the diameter D of the interior space of the heat exchanger. According to an embodiment, the diameter of the cavity of the core portion DK corresponds to at least 30% of the diameter D of the interior space of the heat exchanger. According to the present embodiment, the interior space of the heat exchanger 10 is cylindrical.

Figure 6:
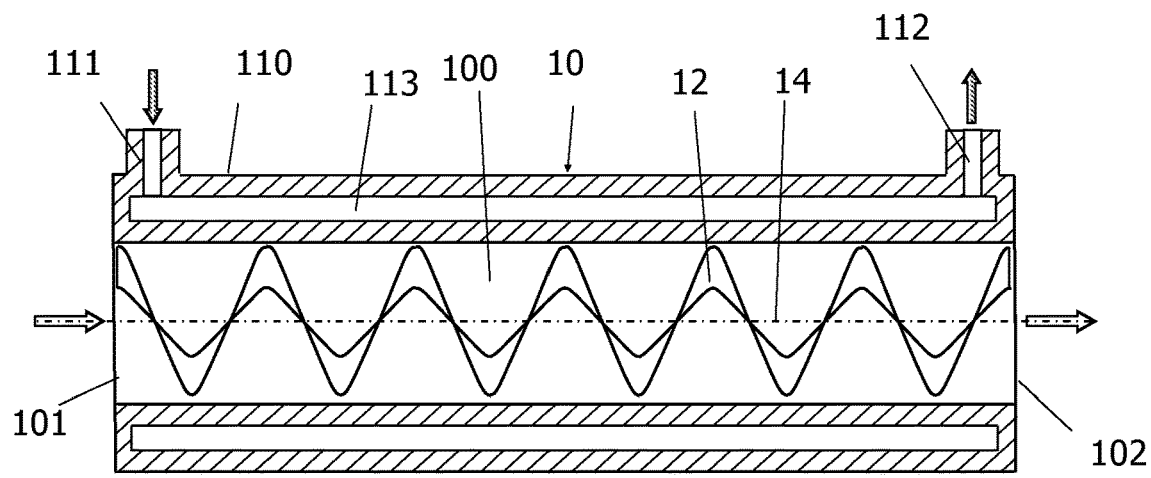

FIG. 6 shows a detail of a heat exchanger 10 according to a second variant, which can be used for any of the systems 1, 2, 3, 4 previously described. FIG. 6 differs from the variant according to FIG. 5 in that the heat transfer fluid flows in countercurrent flow with respect to the flowable biomass flowing through the duct 100.

Figure 7:
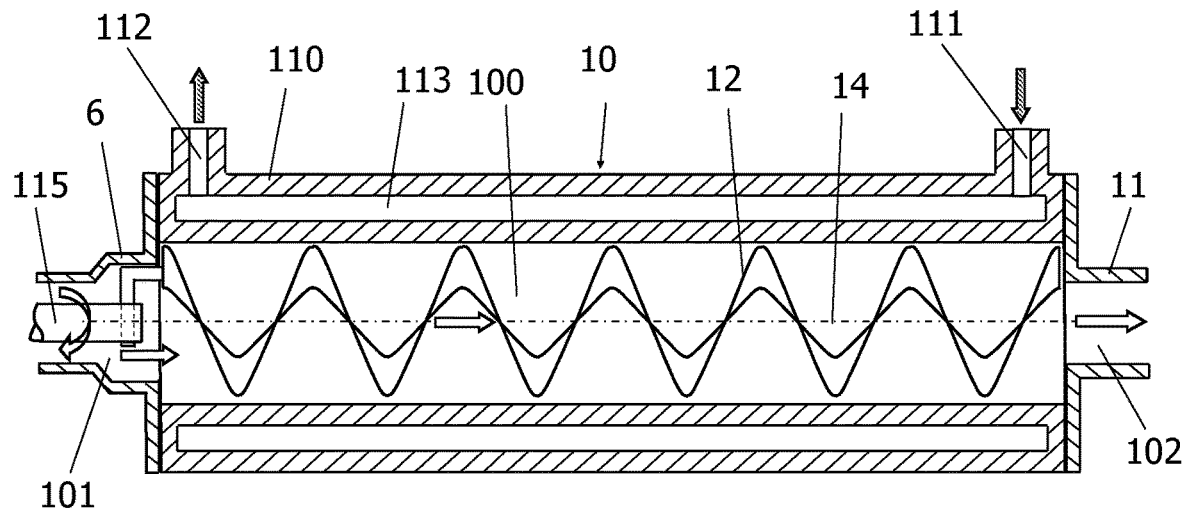

FIG. 7 shows a detail of a heat exchanger 10 according to a third variant, which can be used for any of the systems 1, 2, 3, 4 previously described. FIG. 7 differs from the variant according to FIG. 5 in that the insert element 12 can be made to rotate by means of a drive element 115. When the insert element 12 performs a rotational movement, deposits on the inner wall of the heatable duct casing 110 forming the duct 100 can be removed particularly efficiently from the inner wall. FIG. 7 also shows part of the delivery conduit 6 leading to the inlet opening 101 and part of the connecting conduit 11 leading away from the outlet opening 102. According to the illustration in FIG. 7, the drive element extends into the delivery conduit 6. Alternatively, the drive element 115 could be provided in the connecting conduit 11. The spiral-shaped insert element has no conveying effect, therefore, the drive element 115 can be arranged at any location.

Figure 8:
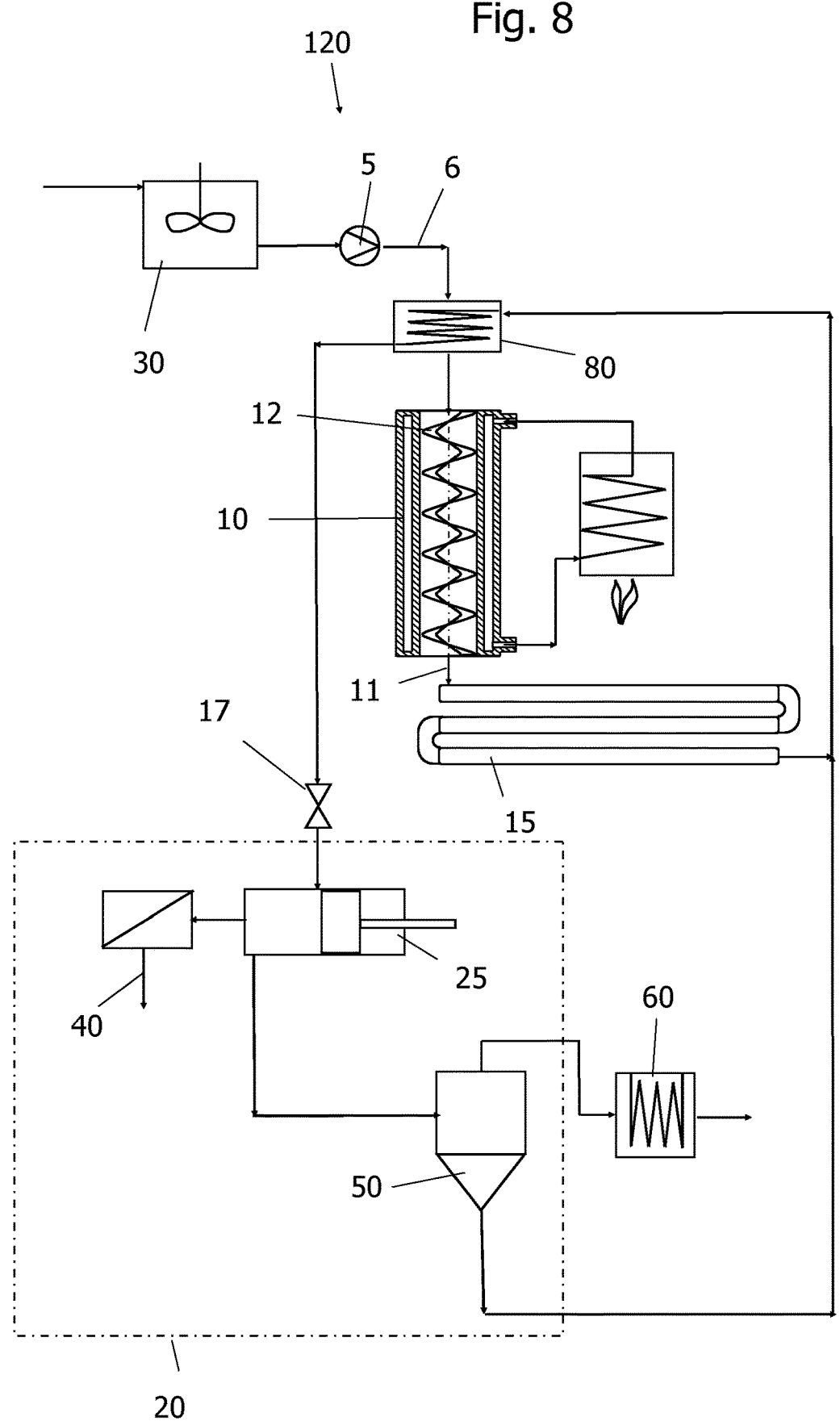

FIG. 8 shows a system 120 for the hydrothermal carbonization of a flowable biomass according to a fifth embodiment. The same reference numerals as in the previous embodiments are used for elements that are the same or have the same effect. The system 120 comprises a pump 5, a heat exchanger 10, a tubular reactor 15 and a separation unit 20. The pump 5 is connected to the heat exchanger 10 via a delivery conduit 6 for the flowable biomass. If the pump 5 is in the operating state, the pressure of the flowable biomass in the delivery conduit 6 leading to the heat exchanger 10 can be increased to a pressure of at least 10 bar. The heat exchanger 10 is connected to the tubular reactor 15 via a connecting conduit 11. In the operating state, there is thus a heated biomass in the connecting conduit 11, which can be fed to the tubular reactor 15 for converting the heated biomass into a carbonaceous reaction product. The heat exchanger 10 contains an insert element 12 and the tubular reactor 15 does not contain an insert element. For the system, a tubular rector 15 can be used, which is insulated from the environment by means of an insulating jacket. In particular, the tubular reactor 15 does not contain a heat exchanger.

According to the present embodiment, a pressure of 18 bar was measured in the delivery conduit. The pressure in the delivery conduit 6 and in the heat exchanger 10 and the tubular reactor 15 can be in the range from 10 bar up to and including 40 bar. The pump 5 can in particular be configured as an eccentric screw pump. The pump 5 is connected to a storage container 30 via a supply line. The storage container 30 can contain a stirring element for the homogenization of the flowable biomass. According to an embodiment, a flowable biomass with a dry matter content of 9.5% (w/w) has been used.

According to this embodiment, the reaction products containing carbon, which leave the tubular reactor 15 as a product stream, can be used as a heat transfer medium, for example for a preheater 80 which is arranged between the pump 6 and the heat exchanger 10 and is used to preheat the flowable biomass. In the present embodiment, the flowable biomass has been heated to a temperature of 120 degrees Celsius, that means that the temperature of the flowable biomass amounts to 120 degrees Celsius when it enters the heat exchanger 10.

The heat exchanger 10 is connected to the tubular reactor 15 via a connecting conduit 11. In the operating state, there is thus a heated biomass in the connecting conduit 11, which can be fed to the tubular reactor 15 for converting the heated biomass into a carbonaceous reaction product. The heat exchanger 10 contains an insert element 12 and the tubular reactor 15 does not contain an insert element.

The heat exchanger 10 for heating the flowable biomass comprises a duct 100 for the flowable biomass, the duct 100 comprising an inlet opening 101 and an outlet opening 102, wherein the duct is surrounded by a heatable duct casing 110. In particular, the insert element 12 is not connected to an inner wall of the heatable duct casing 110, so that the heatable duct casing 110 and the insert element 12 are arranged in the duct 100 such that they can be moved relative to one another. According to this embodiment, the insert element 12 is configured as a spiral-shaped insert element. In particular, the length of the spiral-shaped insert element can essentially correspond to the length of the duct.

According to this embodiment, the heatable duct casing 110 contains a duct casing channel 113 for a heat transfer fluid, the duct casing channel 113 extending from a duct casing channel inlet opening 111 for the heat transfer fluid to enter the duct casing channel 113 to a duct casing channel outlet opening 112 for the heat transfer fluid to leave the duct casing channel 113. The heat transfer fluid can include an oil that is heated by means of a thermal oil burner. According to an embodiment, the temperature of the heated, flowable biomass at the feed into the tubular reactor 15 is 205 degrees Celsius. The temperature of the heated flowable biomass at the feed to the tubular reactor 15 can be in a range from 150 degrees Celsius to 220 degrees Celsius. According to an embodiment, the temperature of the oil is 270 degrees Celsius. The temperature of the oil can be in a range from 250 degrees Celsius up to and including 300 degrees Celsius.

A tubular rector 15 can be used for the system, which is insulated from the environment with an insulating jacket. In particular, the tubular reactor 15 does not contain a heat exchanger.

The separation unit 20 can include a pressing device 25. The separation unit 20 is used to separate the solid components of the carbonaceous reaction product from the liquid components of the carbonaceous reaction product. A plurality of similar or different separating units can be provided for this purpose. According to this embodiment, a first separation unit 20 is provided, which is configured as the pressing device 25. The pressing device 25 can be configured, for example, as a piston press or as a hose press. According to this embodiment, the material to be pressed has a dry matter content of 68.5%. Depending on the composition of the biomass, the dry matter content can range from 50% up to and including 80%.

According to the present embodiment, a second separation unit 20 is provided, which is designed as a dryer 40. According to this embodiment, the solid components of the reaction product containing carbon are fed to the dryer 40.

The portion of liquid components of the carbon-containing reaction product in the solid can be lowered to less than 20%, in particular less than 15%, in particular when using a multi-stage dryer to less than 2.2%. After drying, the dried solid can have a dry matter content of 90%. The dryer can be configured in particular as a fluidized bed dryer. The dried solid can be comminuted in a subsequent method step, for example formed into pellets or briquettes. The solid can be used as a fuel, for example. Depending on the composition, the solid can also be used as a fertilizer. Depending on the application, additional components can be added to the solid in subsequent method steps. If drying is provided for the solid components of the carbonaceous reaction product, the solid can be transported more cheaply and can be stored for a prolonged time. Of course, the solid can also be used as fuel in an incinerator to generate energy.

The liquid components of the carbonaceous reaction product are fed to a downstream third separation unit. According to the present embodiment, the third separation unit comprises an evaporator 50. By means of the evaporator 50, at least some of the volatile components of the liquid components of the reaction product containing carbon are vaporized. The evaporator 50 can be operated as a vacuum evaporator to reduce the thermal energy required for evaporation. The liquid components of the carbonaceous reaction product from the first separation unit contain more than 50% by weight water. The water is at least partially evaporated in the evaporator and, in a subsequent cooling step, cooled by a cooler and/or condensed by a condenser 60, if required. The condensate can, for example, be fed to a wastewater treatment plant and returned to the water cycle.

At least part of the concentrate obtained in the evaporator 50 can be fed into the product stream of the tubular reactor 15 in order to be used as a heat transfer fluid for the preheater 80.

According to this embodiment, the pressure of the stream of carbon-containing reaction products leaving the tubular reactor 15 is reduced to ambient pressure by a pressure-reducing element 17. Depending on the configuration of the downstream separating unit 20, unpressurized operation of the same can be more cost-effective, since the separating unit 20 and other system components possibly downstream of the tubular reactor 15 do not need to be designed as pressure vessels in accordance with the required regulations.

The pressure-reducing element 17 can be configured as a throttle element, for example. In particular, the pressure-reducing element can include a pressure-reducing valve.

Figure 9B:
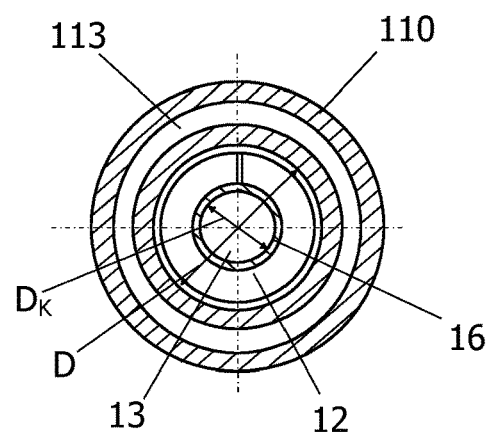
Figure 9A:
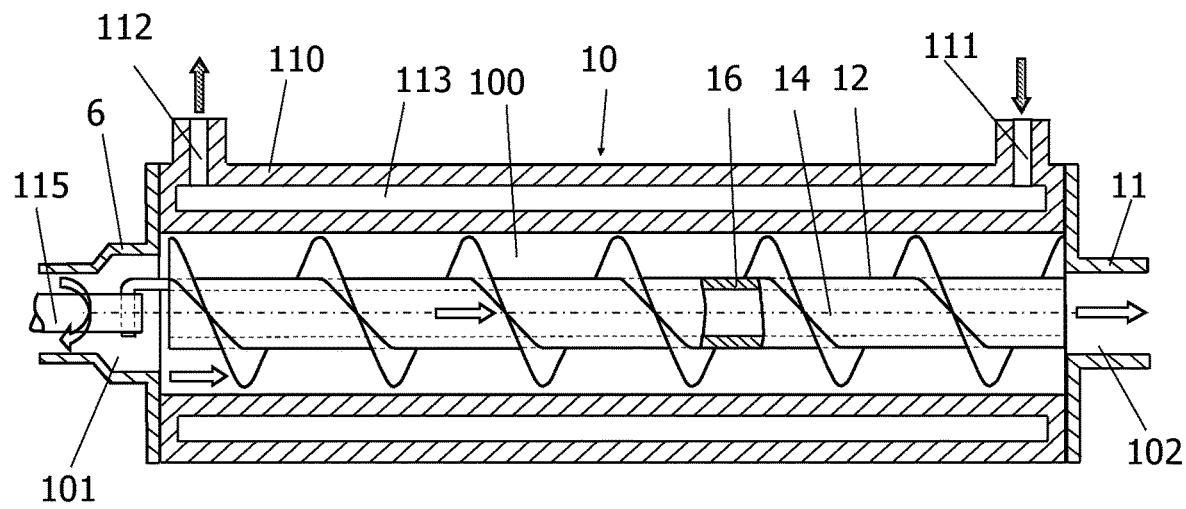
FIG. 9a a detail of a heat exchanger according to a fourth variant.

FIG. 9a shows a detail of a heat exchanger 10 according to a fourth variant, which can be used for any of the systems previously described. According to the present embodiment, the insert element 12 is configured as a twisted tubular element. The twisted tubular element contains a spiral flight. A spiral flight can consist of an element of the group consisting of a protrusion, a groove or an indentation on the twisted tubular element surface that runs spirally. In FIG. 9a, a spiral flight is shown as an example, which is attached as a protrusion on the outside of a tubular element 16, which is part of the twisted tubular element. The arrows shown in the drawing show the flow of the flowable biomass, which flows through the tubular element 16 and flows around the tubular element 16.

As in the variant according to FIG. 7, if the insert element 12 performs a rotational movement, deposits on the inner wall of the heatable duct casing 110 forming the duct 100 can be removed particularly efficiently from the inner wall. FIG. 9a also shows a portion of the delivery conduit 6 leading to the inlet opening 101 and a portion of the connecting conduit 11 leading away from the outlet opening 102. According to the illustration in FIG. 9a, the drive element 115 extends into the delivery conduit 6. The drive element 115 could instead also be attached in the connecting conduit 11.

The tubular element 16 of the insert element 12 is shown partially cut open so that it can be seen that the insert element 12 according to FIG. 9a is also configured without a core.

According to an embodiment that is not shown in the drawings, the tubular element 16 can contain openings in the tubular element casing, so that an exchange can take place between the flowable biomass flowing inside the tubular element and the flowable biomass flowing around the tubular element for further improving the heat transfer.

FIG. 9b shows a radial section through the heat exchanger according to FIG. 9a. The insert element 12 is configured without a core. In other words, the flowable biomass can flow unhindered through a core portion of the heat exchanger 10. A cavity 13 is formed by the insert element 12 and is located in the interior space of the tubular element 16 according to this embodiment. This cavity 13 surrounds the longitudinal axis 14 of the heat exchanger 10, the cavity 13 thus extends in a central portion of the heat exchanger 10, which can also be referred to as the core portion.

The core portion of the heat exchanger extends along the longitudinal axis 14 of the heat exchanger 10. The core portion of the heat exchanger includes, in particular, a portion of the volume of the interior space of the heat exchanger. The core area is configured in particular as a cylindrical cavity 13. The cavity 13 surrounds the longitudinal axis 14 of the heat exchanger, which for the embodiment of a cylindrical cavity coincides with the longitudinal axis of the cylindrical cavity. In particular, the diameter of the cavity 13 of the core portion DK corresponds to at least 25% of the diameter D of the interior of the heat exchanger. According to an embodiment, the diameter of the cavity of the core portion DK corresponds to at least 30% of the diameter D of the interior space of the heat exchanger. According to the present embodiment, the interior space of the heat exchanger 10 is cylindrical.

Figure 10:
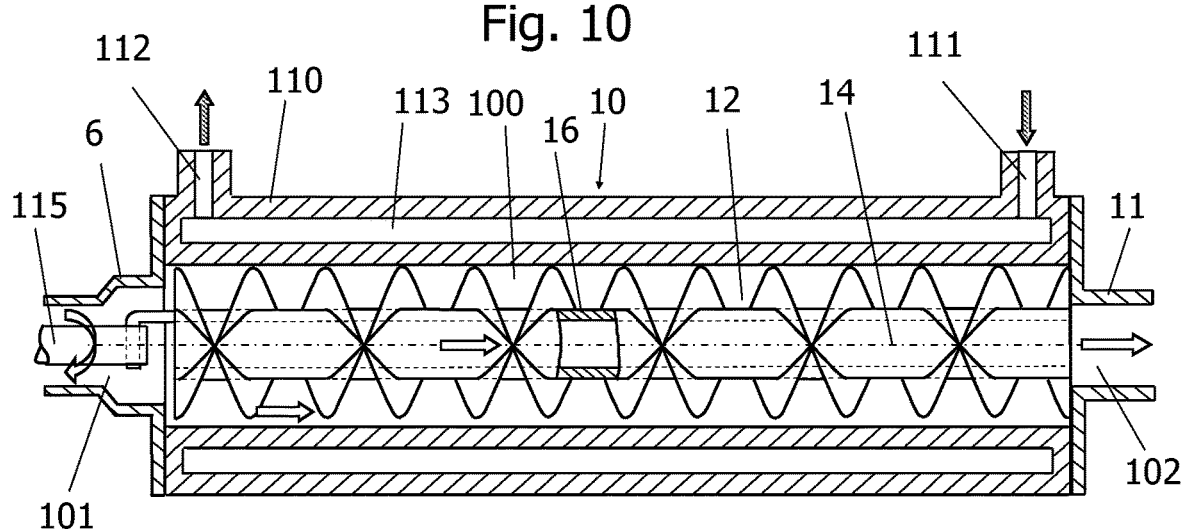
FIG. 10 a detail of a heat exchanger according to a fifth variant.

FIG. 10 shows a detail of a heat exchanger 10 according to a fifth variant, which can be used for any of the systems previously described. FIG. 10 differs from the previous embodiment according to FIG. 9a by the use of an insert element which is configured as a twisted tubular element which contains two counter-rotating spiral flights.

It is obvious to a person skilled in the art that many other variants are possible in addition to the systems or method variants described, without departing from the inventive concept. The subject of the invention is thus not limited by the foregoing description and is to be determined by the scope of protection defined by the claims. For the interpretation of the claims or the description, the broadest possible reading of the claims is decisive. In particular, the terms "include" or "include" should be construed as referring to elements, components or steps in a non-exclusive sense, thereby indicating that the elements, components or steps may be present or used that they can be combined with other elements, components or steps that are not explicitly mentioned. When the claims relate to an element or component from a group that may consist of A, B, C to N elements or components, this language should be interpreted as requiring only a single element of that group, and not one Combination of A and N, B and N or any other combination of two or more elements or components of this group.

The invention claimed is:

1. A system for the hydrothermal carbonization of a flowable biomass, comprising a pump, a heat exchanger and a tubular reactor, wherein the pump is connected via a delivery conduit for the flowable biomass to the heat exchanger and wherein the heat exchanger is connected to the tubular reactor via a connecting conduit, wherein the heat exchanger contains an insert element and the tubular reactor contains no insert element, wherein the heat exchanger for heating the flowable biomass comprises a duct for the flowable biomass, wherein the duct comprises an inlet opening and an outlet opening, wherein the duct is surrounded by a heatable duct casing, and wherein the insert element is not connected to an inner wall of the duct casing so that the duct casing and the insert element are configured to be movable relative to each other in the duct.

2. The system of claim 1, wherein the insert element is configured as a spiral-shaped insert element.

3. The system of claim 1, wherein a length of the insert element essentially corresponds to a length of the duct.

4. The system of claim 1, wherein the insert element has an outer diameter which is up to 10 mm smaller than an inner diameter of the heatable duct casing.

5. The system of claim 1, wherein the insert element has an inner diameter which is greater than 0 and at most 5 mm smaller than an outer diameter of the insert element.

6. The system of claim 1, wherein the insert element is configured as a spiral.

7. The system of claim 1, wherein the insert element has a wall thickness of 2 up to and including 10 mm.

8. The system of claim 1, wherein the insert element contains a metallic material.

9. The system of claim 1, wherein the heatable duct casing contains a duct casing channel for a heat transfer fluid, wherein the duct casing channel extends from a duct casing channel inlet opening for entry of the heat transfer fluid into the duct casing channel to a duct casing channel outlet opening for discharge of the heat transfer fluid from the duct casing channel.

10. The system of claim 1, wherein the duct contains a spiral-shaped insert element which is not connected to an inner wall of the heatable duct casing, so that it is movably arranged relative to the heatable duct casing.

11. The system of claim 10, wherein the heatable duct casing contains a duct casing channel for a heat transfer fluid, wherein the duct casing channel extends from a duct casing channel inlet opening for the supply of the heat transfer fluid into the duct casing channel to a duct casing channel outlet opening for the discharge of the heat transfer fluid from the duct casing channel.

12. A method for the hydrothermal carbonization of flowable biomass, wherein the flowable biomass is conveyed by a pump into a heat exchanger, wherein the flowable biomass is heated in the heat exchanger, and wherein the heated flowable biomass is fed to a tubular reactor after exiting the heat exchanger, wherein the pump is connected to the heat exchanger via a delivery conduit for the flowable biomass and wherein the heat exchanger is connected to the tubular reactor via a connecting conduit, wherein the heat exchanger contains an insert element and the tubular reactor contains no insert element so that the heated flowable biomass flows in a plug flow through the tubular reactor and is converted into a carbonaceous reaction product in the tubular reactor, wherein the heat exchanger for heating the flowable biomass comprises a duct for the flowable biomass, wherein the duct comprises an inlet opening and an outlet opening, wherein the duct is surrounded by a heatable duct casing, and wherein the insert element is not connected to an inner wall of the duct casing so that the duct casing and the insert element are configured to be movable relative to each other in the duct.

13. The method of claim 12, wherein the insert element is arranged in a duct of the heat exchanger, wherein the flowable biomass flows through the duct, and wherein deposits of the flowable biomass are removed from an inner wall of the duct by means of the insert element.

14. The system of claim 1, wherein the insert element is configured as a band shaped element.

15. The system of claim 2, wherein the spiral-shaped insert element is configured as a band-shaped element.

16. The system of claim 8, wherein the metallic material comprises stainless steel or spring steel.

* * * * *